Aug. 22, 1933.        J. P. WALKER        1,923,598
SEPARATOR
Filed July 16, 1931        3 Sheets-Sheet 1

Inventor
Jay P. Walker
Jack A. Ashley
Attorney

Aug. 22, 1933.   J. P. WALKER   1,923,598
SEPARATOR
Filed July 16, 1931   3 Sheets-Sheet 2

Inventor
Jay P. Walker
By
Jack A. Schley
Attorney

Aug. 22, 1933.  J. P. WALKER  1,923,598
SEPARATOR
Filed July 16, 1931   3 Sheets-Sheet 3

Inventor
Jay P. Walker

By Jack A. Ashley
Attorney

Patented Aug. 22, 1933

1,923,598

UNITED STATES PATENT OFFICE 1,923,598

SEPARATOR

Jay P. Walker, Tulsa, Okla., assignor, by mesne assignments, of fifty-four per cent to Jay P. Walker, forty per cent to Guy O. Marchant, and six per cent to C. G. Wells, Tulsa, Okla.

Application July 16, 1931. Serial No. 551,198

9 Claims. (Cl. 183—2.7)

This invention relates to new and useful improvements in separators.

One object of the invention is to secure a primary separation of fluids such as oil and gas in one chamber, then to conduct the heavier liquids such as oil, water and the like downwardly to a collecting chamber and at the same time carry the lighter fluids such as gas and gaseous fluids through a scrubbing stage, and then downwardly to a second scrubbing stage; and then to carry off together the gas from the second scrubbing stage with the gas rising from the oil collecting chamber, and finally to carry off the oil or liquids from the collecting chamber.

A further object of the invention is to accomplish separation of oil and gas in a more efficient manner, whereby an efficient draining of all scrubbing baffles is had, and also whereby the gas may be taken off all the oil in the separator at the lowest possible pressure point.

A construction designed to carry out the invention will be hereinafter described together with other features of the invention.

Figure 1:
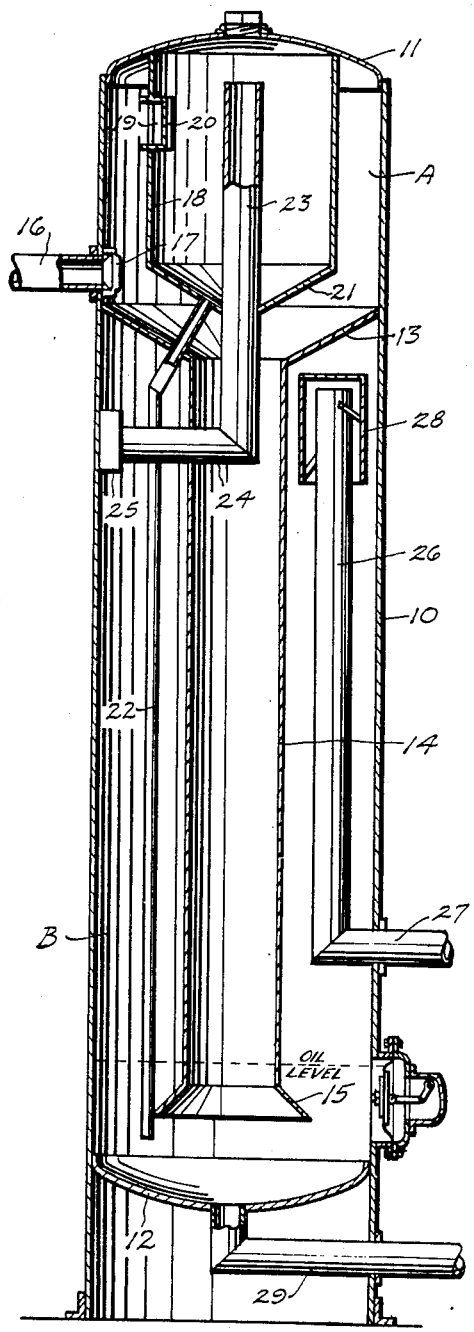
Figure 3:
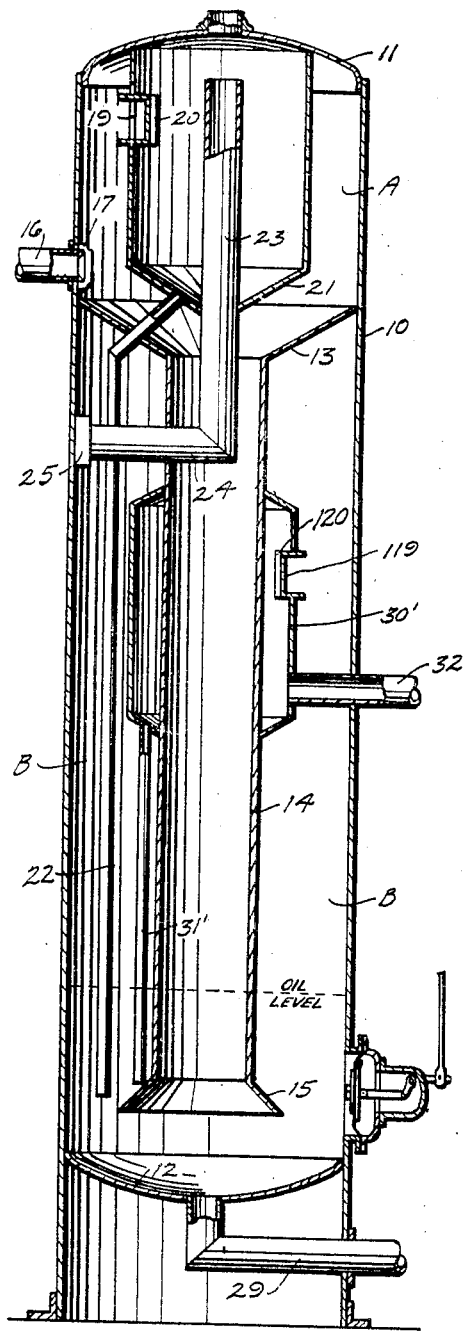
Figure 4:
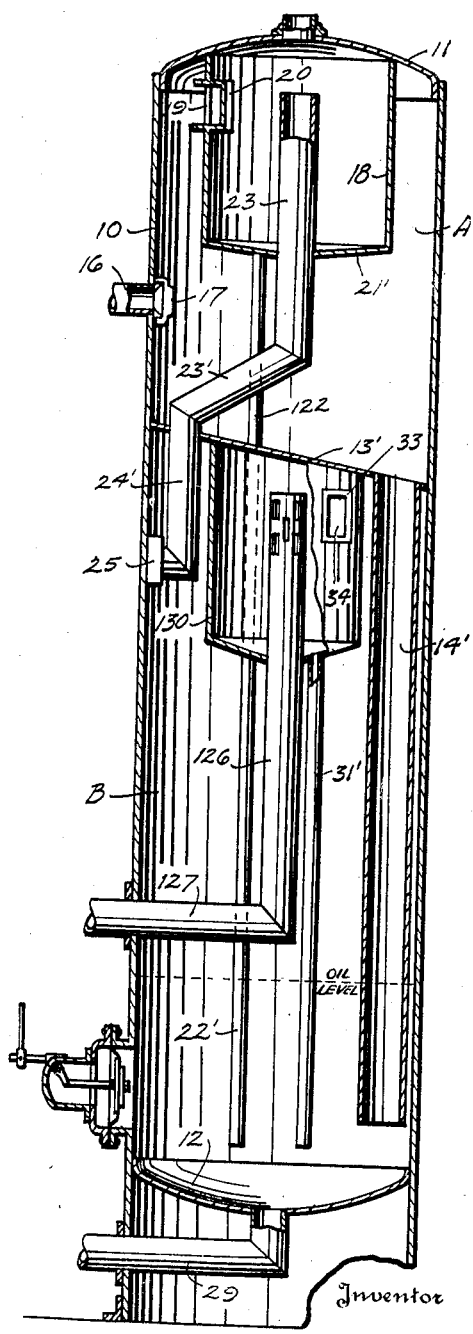
Figure 5:
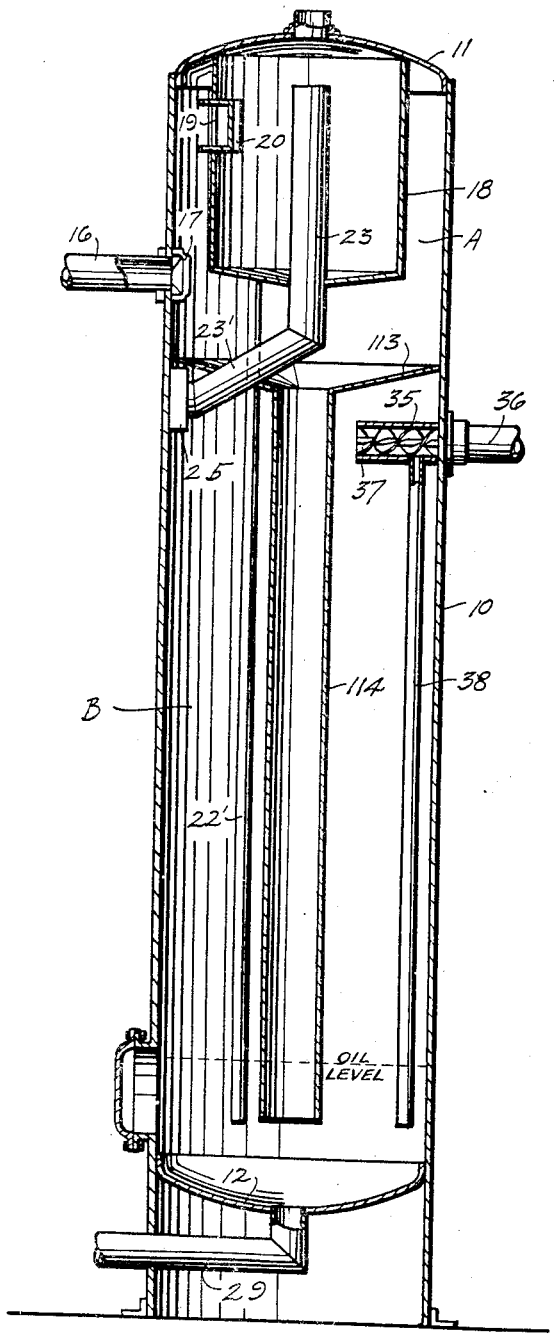
Figure 6:
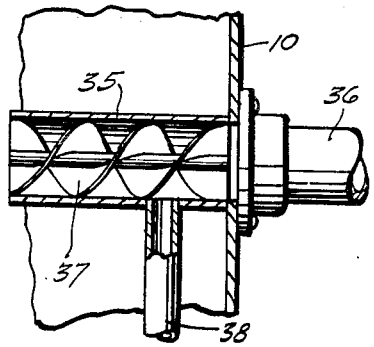
Figure 7:
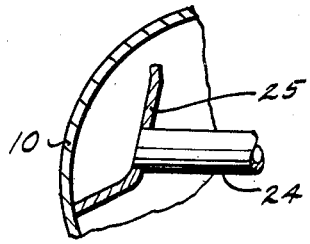

The invention will be more readily understood from a reading of the following specification and by reference to the accompanying drawings in which an example of the invention is shown, and wherein:

Figure 1 is a vertical sectional view showing a separator constructed in accordance with the invention, Figures 2, 3, 4 and 5 are vertical sectional views of various forms in which the invention may be carried out, Figure 6 is a detail of the gas discharge shown in Figure 5, and Figure 7 is a detail showing the diverter in the collecting chamber.

In the drawings, the numeral 10 designates an upright metal tank having a top 11 and a false bottom 12. A primary separating chamber A is formed in the upper part of the tank above an inclined partition or hopper 13. A comparatively large axial column or pipe 14 leads downwardly from the hopper and terminates in a flared skirt 15 a short distance above the bottom 12. The lower portion of the tank constitutes a collecting chamber B.

An influent pipe 16 enters the side wall of the tank and discharges into a diverter 17 mounted on the inner wall of said tank within the chamber A just above the hopper 13. This diverter may be of any suitable form, for instance, as is shown in my co-pending application filed March 19, 1928, under Serial No. 262,954 which has matured into Patent No. 1,823,301, and is arranged to direct the influent against the inner surface of the tank wall and cause it to flow circumferentially there-around. The heavier fluids such as oil, water and the like will be carried downwardly and directed by the hopper 13 and the column 14. These liquids will be directed in the chamber B at the bottom of the tank. The lighter fluids such as gas and gaseous fluids will be carried around the chamber A, and permitted to rise therein.

A cylindrical baffle 18 is suspended from the top 11 concentrically in the chamber A and has one or more inlets 19 near its upper end. Each inlet has a deflector 20 on its inner side for directing the gaseous fluids circumferentially within the baffle. The baffle has a conical bottom 21 from which a drain pipe 22 leads down through the hopper 13 to a point near the bottom 12 and below the liquid level in the tank for draining such liquids as are scrubbed out in the baffle.

A gas discharge pipe 23 extends axially from the upper portion of the baffle down through the bottom 21, and is connected with a lateral pipe 24, directed toward the outer wall of the tank just below the hopper 13. The outer end of the pipe 24 is fastened in a diverter 25 similar to the diverter 17, and shown in detail in Figure 7. The gaseous fluids entering the pipe 23 will carry with them more or less moisture in the form of oil or water, and such fluids will be discharged against the inner wall of the tank 10 and carried circumferentially there-around, whereby entrained moisture will be scrubbed out. These gases liberated in the tank 10 above the liquid level and below the hopper 13 will mingle with the gases arising from the oil collected in the chamber B. A gas outlet pipe 26 is mounted in the tank below the hopper 13 and has its lower end connected to a lateral pipe 27. A hood 28 is mounted on the upper end of the pipe 26. The gas from the tank enters the bottom of the hood 28 and is carried off through the pipes 26 and 27. The hood prevents heavy gaseous fluids and oils from entering the pipe 26. Gaseous fluids vary in quality and range from so called dry gas to heavy vapors, which latter are so heavily laden with oil as to settle rather than to rise. The heavy vapors are known as heavy gases.

The pipe 27 is provided with a suitable gas valve for controlling the discharge of gas, but under proper conditions it would be possible to do away entirely with the valve. An oil discharge pipe 29 leads from the false bottom 12 through the wall of the tank 10, and may be equipped with a suitable valve (not shown). It would be possible under the right conditions to do away with the oil valve. It is to be understood that any suitable means for controlling the discharge of the oil and gas may be employed, and as the invention is not limited to the particular kind of controlling means, it is not believed necessary to illustrate or describe the same any more than is herein stated. The diaphragm control shown in the copending application of E. R. Williams filed December 5, 1930, Serial No. 500,303, is indicated in the drawings and may be used.

Figure 2:
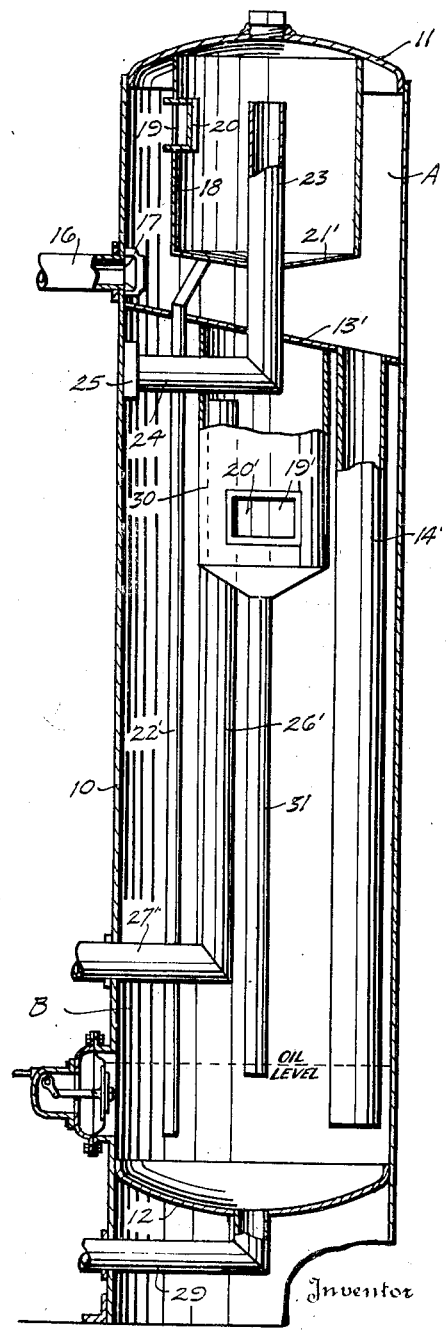

In Figure 2 another structure is shown, and it will only be necessary to describe the parts which are radically different. The baffle 18 has a conical bottom 21', which is less acute than that shown in Figure 1. Instead of the hopper 13, a partition 13' is inclined downwardly across the tank from the diverter 17. In place of the column 14 a down pipe 14' extends from the lower end of the partition.

The gas discharge pipe 23 extends axially down through the partition 13' and is connected to the pipe 24. A secondary cylindrical baffle 30, is hung from the partition and a drain pipe 31 extends from the bottom of this baffle to a point below the liquid level in the tank 10. A drain pipe 22' similar to the pipe 22 extends from the bottom 21' down through the partition 13' to a point near the bottom 12. A gas outlet pipe 26' extends from the upper portion of the secondary baffle 30 through its bottom down to a lateral discharge pipe 27'. The secondary baffle 30 has an inlet opening 19' and a deflector 20' therein for causing the gaseous fluids to whirl within said baffle.

In Figure 3 another form is set forth, which is very similar to Figure 1 except that a secondary baffle 30' surrounds the column 14 in the chamber B. This baffle has an inlet 119 and a deflector 120 for whirling the gaseous fluids which enter said baffle. A drain pipe 31' leads from the bottom of the baffle to the chamber B. A gas outlet pipe 32 extends from the lower portion of the baffle 31' through the side of the tank.

The form illustrated in Figure 4 is a combination of the forms shown in Figures 1 and 2 with certain modifications. The inclined partition 13' is placed at a lower point in the tank than in Figure 2 and the lower end of the pipe 23 is connected to an inclined pipe 23', which in turn is connected with a vertical pipe 24' extending through the partition, and suitably connected with the diverter 25. A drain pipe 122 leads from the bottom 21' of the primary baffle down through the partition to a point near the bottom of the tank.

A secondary cylindrical baffle 130 is suspended from the partition 13' at the center of the tank, and has an inlet opening 33 similar to the opening 19' and a deflector 34 similar to the deflector 20'. The opening 33 is placed higher in the baffle and is vertically elongated in Figure 4, whereas in Figure 2, the inlet is lower and transversely elongated. An axial gas outlet pipe 126 leads from the secondary baffle to a lateral outlet pipe 127. In Figure 5, a cylindrical baffle 18 similar to Figures 2 and 4 is employed, and the inclined pipe 23' is carried directly to the diverter 25, through a hopper 113 similar to the hopper 13. A reduced column 114 similar to the column 14 extends axially downward from the hopper. A horizontal secondary baffle including a cylindrical sleeve 35 is mounted on the inner wall of the tank 10 just below the hopper 113. This sleeve is connected with a gas outlet pipe 36. Within the sleeve is a helical deflector 37, and a drain pipe 28 leads from the sleeve for carrying the extracted oil to the bottom of the tank. The collection chamber in each form is all that portion of the tank below the partitions 13, 13' and 113.

The operation in all of the forms is in a general way the same. The influent is conveyed to the separator by the pipe 16 and discharged into the diverter 17, which turns it back upon the inner wall of the chamber A and causes it to take a circumferential path around said chamber. The heavier fluids, such as liquids which may be oil, water and the like, will naturally take a downward course and work their way down the hopper 13 and into the column 14. This will of course, be due also to a reduction in velocity which will permit the liquids to finally seek the central column. The gases and gaseous fluids being lighter will tend to rise in the chamber A, thus taking an upward course. These fluids will contact with the inner wall of the tank 10 and the outer wall of the baffle 18 within the chamber A. By this contact, and of course, some travel on said walls, the heavier particles of moisture or liquid will be scrubbed out and drained down to the hopper 13 and the column 14.

It will be seen that a primary separation or segregation takes place in the chamber A and this is very important as it tends to quickly get the gas away from the oil. The rising gaseous fluids pass through the inlet 19 and are turned by the deflector on to the inner surface of the baffle 18, whereby they are directed circumferentially within said baffle. Additional scrubbing will be done by contact with the wall of the baffle and the outside of the gas pipe 23. Such liquids as are extracted within the baffle are drained out through the pipe 22. The gaseous fluids passing into the baffle 18 will still have considerable velocity and the whirling therein will tend to maintain or possibly increase this velocity. The fluids seeking an escape will enter the pipe 23 and pass downward to the pipe 24, and thence to the diverter 25. There will be a reluctancy on the part of the gaseous fluids to pass downwardly, and this will be accentuated when the fluids are spread circumferentially on the wall of the tank by the diverter 25. Consequently a very thorough scrubbing and extraction of liquid particles will be carried out by this last scrubbing step.

The oil which has passed down the column 14 will collect in the chamber B, and by reason of the skirt 15, the oil will be spread as it is discharged so that the gaseous bubbles will more rapidly leave the oil in the chamber B and rise in the tank 10. These bubbles will finally be scrubbed out by contact with the metal walls within the tank above the liquid level. The gas which is discharged from the diverter 25 together with the gas which rises from the oil in the chamber B will be collected in the hood 28 and carried off together through the pipes 26 and 27.

It is pointed out that the oil and gas are finally taken off the same prtion of the tank, that is, there are no partitions separating the chamber B from the upper portion of the tank below the hopper 13. This permits the gas and oil to be taken out at the lowest possible pressure, and also will induce the most efficient draining of all scrubbing baffles. A higher liquid level can be carried in the tank than in the usual separator where the influent is directly discharged into the chamber in which the oil is collected. There is practically no danger of oil being blown back or up through the drain pipes because there is less pressure differential between the interior of the baffle 18 and the chamber B than in the ordinary type of separator. Much more efficient separation and more quiet oil can be discharged from the tank by this method of separation.

In Figure 2 the operation is largely the same except that the gaseous fluids are given a third scrubbing by passing them through the secondary baffle 30, and a more thorough scrubbing of the gaseous fluids will be carried out. Figure 3 is a combination of Figures 1 and 2, and its operation will be clear from what has already been said.

The operation in Figure 4 is substantially the same as in Figure 2 except that a larger primary separation chamber is provided, and a better opportunity is given for dissipating the force of the liquids entering the column 14'. The entrance 33 to the secondary baffle is at a higher point than in Figure 2, and the scrubbing inside would be reduced as compared with Figure 2, but in either event, the final stage of extraction would be sufficient. In Figures 2, 3 and 4, the draining of the secondary baffles is as efficient as is the draining of the primary baffle 18.

The form shown in Figures 5 and 6 also carries out the three stages of scrubbing of the gaseous fluids, the first two stages are substantially the same as in Figures 1 and 3. The third stage is accomplished by subjecting all of the gases, both those rising from the collected liquid and those discharged from the diverter 25, to a whirling, scrubbing action by passing them through the said sleeve 35 and around the deflector 37. The gases will pass out through the pipe 36, and the moisture finally extracted will drain down through the pipe 38.

Various changes in the size and shape of the different parts, as well as modifications and alterations, may be made within the scope of the appended claims.

Having illustrated and described preferred forms of the invention, what I claim, is:

1. In a separator, an upright tank, having an influent inlet, a primary separating chamber at the upper end of said tank and a collection chamber below also in said tank, a scrubbing baffle in said primary chamber, a liquid conductor leading from the said primary chamber to said collection chamber, a conductor for carrying the gaseous fluids from the baffle to the collection chamber, and means for carrying gases from the collection chamber.

2. A separator as set forth in claim 1 and a drain pipe from the baffle to the collection chamber.

3. A separator as set forth in claim 1 and means for scrubbing the gaseous fluids in the collection chamber prior to discharge.

4. In a separator, an upright tank having an influent inlet, a primary separating chamber at the upper end of said tank and a collection chamber below also in said tank, a scrubbing baffle in said primary chamber, a liquid conductor leading from the said primary chamber to said collection chamber, a conductor for carrying the gaseous fluids from the baffle to the collection chamber, and means for causing the gaseous fluids from the baffle to whirl in the upper portion of the collection chamber, a drain pipe leading from the baffle to the collection chamber, and means for carrying off the gases from the collection chamber.

5. The method of separating oil and gas which consists in primarily separating the oil and gas in a separate chamber, then flowing the oil by gravity to a collection chamber to reduce it to a quiescent state, at the same time scrubbing the gaseous fluids and conducting them to the oil collection chamber free from contact with the oil, scrubbing the gaseous fluids in the collection chamber, carrying off the gases rising from the oil in the collecting chamber with the gases delivered to the said chamber without mixing said gases with the oil, and finally passing the gases rising from the collected liquids and the gases discharged from the second scrubbing stage through a third scrubbing stage before final discharge of the same.

6. In a separator, an upright tank having an influent inlet, a primary separating chamber at the upper end of said tank and a collection chamber below also in said tank, a scrubbing baffle in said primary chamber, a liquid conductor leading from the said primary chamber to said collection chamber, a conductor for carrying the gaseous fluids from the baffle to the collection chamber, a diverter on the end of the gaseous fluid conductor contiguous to the outer wall of the collection chamber for spreading the gaseous fluids thereon, and means for carrying gases from the collection chamber free from connection with the primary separating chamber.

7. In a separator, an upright tank having an influent inlet, a primary separating chamber at the upper end of said tank and a collection chamber below also in said tank, a scrubbing baffle in said primary chamber, a liquid conductor leading from the said primary chamber to said collection chamber, a conductor for carrying the gaseous fluids from the baffle to the collection chamber, a skirt at the lower end of the oil conductor for spreading the oil, a gas escape pipe extending from the collection chamber, and a hood on the entrance end of the gas escape pipe.

8. In a separator, an upright tank having an influent inlet, a primary separating chamber at the upper end of said tank and a collection chamber below also in said tank, a scrubbing baffle in said primary chamber, a liquid conductor leading from the said primary chamber to said collection chamber, a conductor for carrying the gaseous fluids from the baffle to the collection chamber, a cylindrical baffle in the collection chamber for receiving therein and scrubbing the gaseous fluids in the said chamber, and a gas escape pipe leading from said cylindrical baffle through the tank wall.

9. In a separator, an upright tank having an influent inlet, a primary separating chamber at the upper end of said tank and a collection chamber below also in said tank, a scrubbing baffle in said primary chamber, a liquid conductor leading from the said primary chamber to said collection chamber, a conductor for carrying the gaseous fluids from the baffle to the collection chamber, a sleeve in the upper end of the collection chamber, a gas escape pipe connected with said sleeve, a drain pipe leading from the sleeve, and a helical baffle mounted in said sleeve.

JAY P. WALKER.